June 12, 1962 A. N. ANDREWS 3,038,967

AUTOMATIC TELEPHONE OPERATING DEVICE

Filed Sept. 8, 1959

INVENTOR:

Anatol N. Andrews

United States Patent Office 3,038,967
Patented June 12, 1962

3,038,967

AUTOMATIC TELEPHONE OPERATING DEVICE

Anatol N. Andrews, 6033 Dauphin Ave.,
Los Angeles, Calif.

Filed Sept. 8, 1959, Ser. No. 838,518
6 Claims. (Cl. 179—5)

This invention relates to automatic alarm systems using telephone apparatus and public telephone system, for instance, as indicated in the preamble of my United States Patent No. 2,883,460, and is an improvement in automatic telephone operating device for such alarm transmitting systems, and more specifically is an automatic push-button device for such alarms whereby the latter may contact automatically an outside telephone number, for instance, of the telephone company operator, through a telephone apparatus which employs push-buttons instead of the heretofore common dial wheel.

In the heretofore and presently commonly used dial-type telephone apparatus, in order to contact a desired outside number, for instance, of the telephone operator, the dial wheel has to be turned and then released. Ordinarily it is done manually, while in my aforesaid U.S. Patent No. 2,883,460 it is done automatically by a mechanical finger operated electrically.

Recently it has been publicly announced that certain telephone companies are planning to bring out for public use a telephone apparatus where the dial wheel is substituted by manually operated push buttons.

When it happens, an automatic alarm device, adapted for dialing the telephone dial wheel, will not be susceptible of operating the push button type telephone apparatus.

It is the prime object of this invention to provide a device whereby an automatic alarm system of aforesaid class will be susceptible of operating automatically a telephone apparatus having push-buttons instead of the dial wheel.

It is further the object of this invention to provide adequate pushing means automatically actuated in co-ordination with operating requirements of the telephone apparatus and with other components of such automatic alarm system, to push or caused to be pushed automatically a button or plate, or both, in required sequence and timing in a push-button telephone apparatus in order to accomplish contact with an outside number via available telephone system.

It is also the object of this invention to provide an automatic alarm device comprising means to engage automatically a push button, or buttons, and/or a push-plate, of a telephone apparatus using such buttons and/or plate instead of the heretofore dial wheel and/or lift-type transmission switch.

It is among the objects of this invention to make the device, incorporating the principles thereof, simple, practical and easy and inexpensive to manufacture.

To illustrate how these and other objects of this invention can be practically achieved, reference now is being made to the accompanying drawings.

Figure 1:
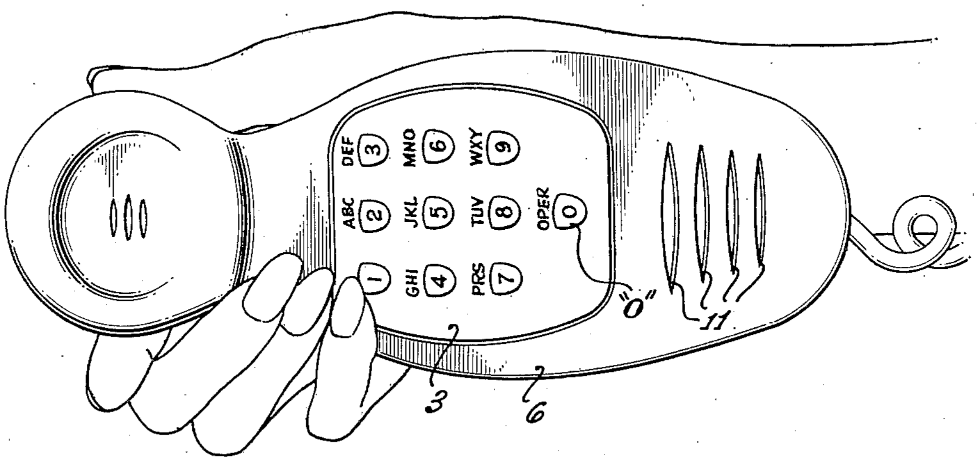
FIGURE 1 is the elevational front view of the proposed push-button telephone apparatus operatively held in a human hand.

The pictorial illustration disclosed in FIGURE 1 is copied from a picture in a national magazine of recent issue, said picture there being a part of a full page advertisement by a manufacturing and supply unit of a major national telephone system which represents there said picture as of a hand operated push-button telephone apparatus of close future. No explanation, however, is given therein as to the exact mode of operation nor as to the required sequences and/or timing thereof. Nevertheless said picture suggests requirements within sound engineering logic. For instance, it is quite evident that, in order to contact the telephone operator, the small button marked "0" has to be compressed. It also appears that the little finger of the shown human hand presses the square plate 3. It is logical to assume that the latter must be the means for closing the telephone transmission switch—equivalent to lifting the old receiver—to obtain the dial tone.

If so, it is hard to expect, however, from an average person to hold said plate 3 compressed with a finger during a lengthy telephone conversation. Thus said plate 3 must be of the so-called "tap" switch type, i.e. once compressed it should be released to jump back automatically to original position while the telephone transmitter will remain closed until said plate 3 is pushed ("tapped") again and released. Therefore, at the end of the conversation, said plate 3 must be apparently compressed and released in order to open telephone transmitter circuit and restore the telephone line to original disengaged condition.

By the same reasoning, a person, after compressing and releasing the plate 3 the first time, should thereafter wait for the telephone tone before pressing the shown small buttons, like button "0," for the desired outside number.

Since many outside numbers often comprise several of the same numerals, for instance, as in "WE 5–5333," it stands to reason that said shown small numeral buttons, like the one marked "0," are also "tap" type switches, respectively, i.e. each, after being compressed, has to be released before compressing it again, and that, after such button is compressed and released, it jumps back to original position automatically while the achieved contact for one numeral remains secured until freed by opening the transmitter switch, for instance, via plate 3.

Of course, the afore reasoning is based merely upon the known requirements in manual operation of the present, dial-type, telephone apparatus. Nevertheless the telephone companies obviously will not put out a new apparatus which would be harder to operate manually than their said present one. If anything, it may be even easier to operate manually than afore theorized, hence it would be easier to operate it automatically. Therefore, if automatic means herein are revealed to substitute aforesaid "harder" manual operation, to convert them to a substitution of "easier" manual operation, will be evidently simple and call for a mere reduction of components and/or circuits re-arrangement which would require only an ordinary specialized skill. Thus it would not jeopardize the patent protection of the basic principle of this invention which comprises the new and original concept of providing automatic means to operate automatically a manual "push-button" type of a telephone apparatus.

Figure 2:
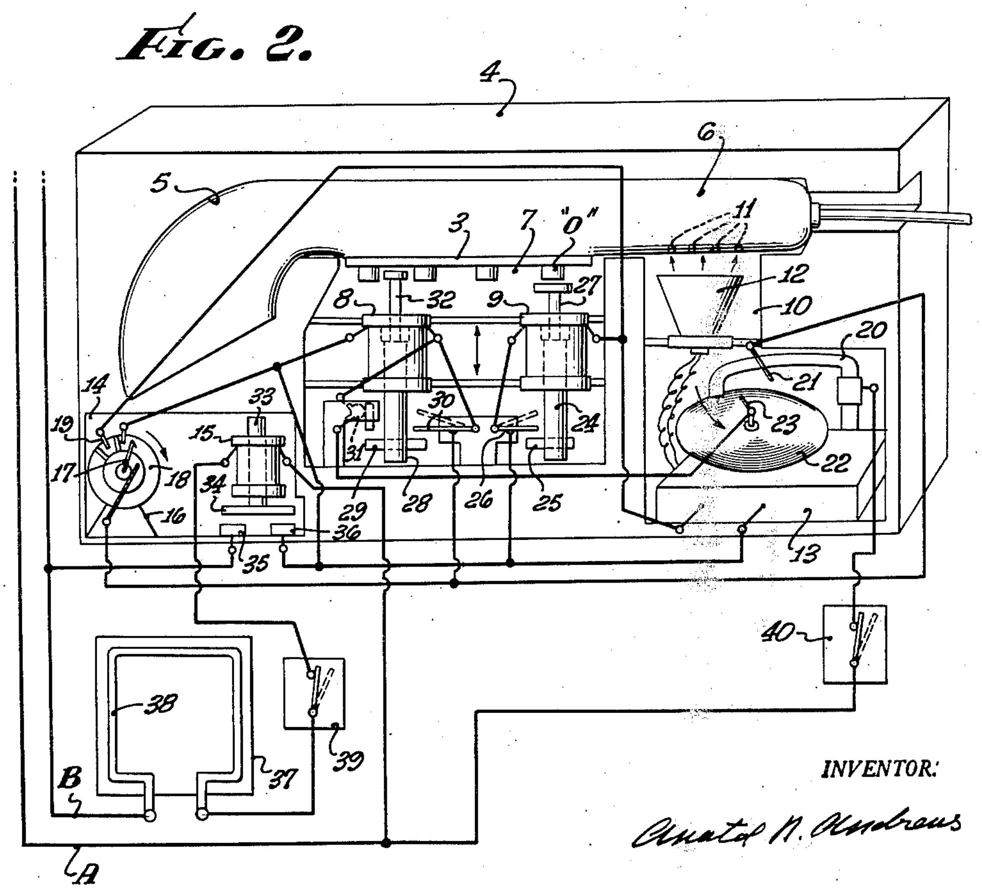
FIGURE 2 is elevational side view of said apparatus placed for automatic engagement within a device incorporating principle of this invention.

To illustrate, as an example, how the aforesaid concept and principle of this invention may be reduced to practice to cope even with the harder of said requirements, reference is being made to FIGURE 2 of the accompanying drawings. Here a base 4 has several compartments. An elongated compartment 5 of configuration susceptible of receiving and stationary holding sidewise horizontally a push-button telephone apparatus 6 of the type shown in FIGURE 1. Compartment 7, extending downwardly from compartment 5 and allowing adequate room for the telephone plate 3 and for the small telephone buttons, including button numerated "0," when said plate and buttons are in disengaged positions; said compartment 7 also stores two stationary secured solenoids 8 and 9. Compartment 10, likewise extending downwardly from compartment 5 to allow free access to the voice receiving openings 11 of the telephone 6; said compartment 10 stores stationary secured loud-talker 12 which freely faces said telephone openings 11, and stationary secured thereunder a record conveying electric machine, for instance, shown phonograph 13. Compartment 14 stores stationary secured relay solenoid 15, and stationary secured delaying action relay 16. The latter has electric motor which rotates clockwise a resilient and conductive arm 17 over conductive circular plate 18 until said arm 17, when moving clockwise, will fall into the shown recess over conductive plate 19 at the bottom of said recess and insulated from plate 18.

In reference to phonograph 13, its needle-arm 20 is conductive and, while engaged over turning recording 22, will remain in sliding contact with conductive wire 21 until said arm 20 reaches the end of said recording 22, whereafter said arm 20 will lose its contact with said wire 21 and will become in contact with conductive wire 23.

In reference to solenoid 9, its movable rod 24, in its lower section, has a crosswise protuberance 25 adapted to engage, on its way upwardly, and to open continuously switch 26 which originally is closed; the upper end of rod 24 has secured thereto thinner rod 27 which extends upwardly through and beyond solenoid 9, and its T top faces adjacently the telephone push-button "0" for engagement therewith when solenoid 9 is energized.

In reference to solenoid 8, its movable rod 28, in its lower section, has a cross bar 29 therethrough and protruding substantially on each side thereof, and adapted, on its way upwardly, to engage, by pushing contact, simultaneously switches 30 and 31. Switch 31 is a "tap" type switch, originally open, and becoming closed when pushed the first time, and becoming open again when pushed the second time. Switch 30, like switch 26, is originally closed and becomes continuously open after the first push thereagainst. The upper end of rod 28 has secured thereto thinner rod 32 which extends upwardly through and beyond solenoid 8, and its T top faces adjacently freely and directly a section of telephone plate 3 between said telephone small push buttons, like the numeral button "0."

In reference to the relay-solenoid 15, the lower end of its movable rod 33 has conductive plate 34 secured crosswise thereto horizontally and above conductive terminals 35 and 36, which terminals are insulated from each other, but are conductively bridged when plate 34 falls over them.

Window 37 has conductive wire-tape embodied over the inner side of its glass and forming circuit 38.

Manually operated switch 39 is adapted to close or open wire circuit between one terminal of said tape circuit 38 and one terminal of solenoid 15.

Wires A and B are the leading wires from the source of electric energy.

Manually operated switch 40 is adapted to close or open the circuit from leading wire A to the terminal of the phonograph conductive needle-hand 20.

By following the shown electric circuits and their respective connections with said wires A and B and with the respective terminals of the described components of the shown device, the following may be easily observed:

If the described arrangement is installed, for instance, in a store, as a night time burglar alarm system, then, during the day working hours, the switches 39 and 40 should be kept open; at the closing of the business for the day the store owner, or whoever leaves the store last, before departure for the night, should first close switch 39. It will immediately actuate solenoid 15, whereby its movable bar 33 will jump upwardly and so carry plate 34, away from terminals 35 and 36, making the latter two insulated from each other. Then the switch 40 must be closed.

If during the night burglars break the glass in window 37, its tape circuit 38 will be automatically broken which will de-actuate solenoid 15 thus causing plate 34 to drop by gravity over terminals 35 and 36 thereby conductively bridging the latter two with each other. As soon as it happens, solenoid 8 will become actuated, thus its movable bar 28 will jump upwardly causing the T top of bar 32 to compress telephone plate 3. Said compressure, however, will be only momentary since bar 28 will drop back by gravity as soon as its cross bar 29, moving upwardly, pushes switches 30 and 31, specifically switch 30. Therefore plate 3, being compressed momentary, will be allowed thereafter to resume freely its original position. Simultaneously with described actuation of solenoid 8, the electric motor of the delaying action relay 16 will become actuated and start moving clockwise its conductive arm 17 over its conductive circular plate 18. In such movement arm 17 will, after certain lapse of time, reach the recessed conductive plate 19 which is insulated from plate 18. When conductive terminal of arm 17 will drop over recess plate 19, it will lose contact with plate 18 and become in conductive contact with plate 19, the motor of relay 16 will thereby stop, and the actuating contact will be established with solenoid 9 and phonograph 13. Then bar 24 of solenoid 9 will jump upwardly causing the T top of bar 27 to compress telephone numeral button "0." Said compressure, however, will be of momentary nature since bar 24 will drop back by gravity as soon as its crosswise protuberance 25, moving upwardly with bar 24, presses against switch 26 thus opening the circuit which prior thereto actuated solenoid 9.

In the meantime, simultaneously with the momentary actuation of said solenoid 9, the phonograph 13 will become actuated, which will engage needle-arm 20 with recording 22, moving arm 20 towards the center of said recording 22 and thus delivering pre-recorded message into the loud talker 12 and therefrom into receiving openings 11 of the telephone apparatus 6.

When arm 20 will reach the end of the pre-recorded message it will be at the point where it will lose its contact with conductive wire 21, this will stop the phonograph 13, however by that time and at the proximity of said point arm 20 will become in conductive contact with wire 23 which will again close the circuit into solenoid 8 causing its bar 28 again to jump upwardly thus again compressing telephone plate 3 via the T top of bar 32. Again said compressure will be of only a momentary nature since the cross bar 29, moving upwardly with bar 28, will again push "tap" switch 31, which will open said circuit and cause bar 28 to drop back by gravity, thus allowing plate 3 to resume freely its original position. This second compressure of plate 3 would disengage telephone apparatus 6, this time opening its transmitter switch, which would allow the arrived police to use the telephone line on the premises to summon, as required, the owner or the alarm company to restore the alarm device to its original condition.

Now, suppose the workings of the illustrated in FIGURE 1 telephone apparatus 6 follow a different pattern than has been afore assumed. Suppose, for example, plate 3 is a mere decoration, and the closing and opening of the telephone transmitter switch are accomplished in the conventional manner, i.e. by lifting receiver 6 from and restoring to some switch stand. In that case, an arrangement, for instance, similar to the described in my U.S. Patent No. 2,883,460, may be incorporated, and solenoid 8 with its co-operating components (28, 29, 30, 31 and 32) removed. Or, suppose, for example, the required sequence is otherwise or in reverse to what has been described in reference to FIGURE 2, then the shown circuits and/or relay switches may be appropriately changed, reversed and/or re-arranged, which evidently would require but an ordinary electrician's skill.

Therefore, while the basic principle of this invention, after it has been herein revealed and taught, has been herein reduced to practice in herein exemplified, by showing and/or describing, structures, it is understood, of course, that wide variety of modifications may be made incorporating the principle of this invention within the scope of the accompanying claims without jeopardizing this patent protection, and that the latter is limited only by the scope of said claims.

I claim as my invention:

1. Electrically energized automatic alarm device actuated by outside disturbance for contacting and transmitting to outside telephone number pre-recorded vocal message via push-button type telephone apparatus and public telephone system, and comprising a base for such apparatus and co-operating components, an alarm circuit with relay switch responsive to outside disturbance, means for closing the telephone transmitter switch, inanimated member for pushing a numeral push-button of said telephone apparatus, solenoid means for actuating said pushing member, relay means for de-actuating said solenoid means, means for restoring the pushing member to original position, electrically operated machine for conveying pre-recorded vocal message into the receiver of said telephone apparatus, electric circuits between said respective components and source of electric energy, means for governing sequence and timing for actuating said circuits in regard to operating requirements of said telephone apparatus.

2. As in claim 1 and means for opening the telephone transmitter switch automatically after transmission of said message.

3. In apparatus for automatically calling a telephone number on a push button type telephone secured therewith, a combination including a plurality of solenoids, a delaying action relay mechanism adapted for channeling electric energy from available source and via provided electric circiuts to one of said solenoids, identified as the first solenoid, and, after lapse of predetermined time based upon time required for occurrence of the telephone dial tone, switching the channeling to another of said solenoids, identified as the second solenoid; the first solenoid being stationary secured opposite one of the telephone depressible members, identified as the first depressible member; and the second solenoid being stationary secured opposite another of the telephone depressible members, identified as the second depressible member; a movable member actuated by the first solenoid, when the latter is energized, for actuating said first depressible member and having means for, when so moved, tapping a tap-type switch, identified as the firts switch and which is initially open and closes by the first tapping and opens by the second tapping, and opening another, separate, break-type switch, identified as the second switch and which is initially closed; another movable member actuated by the second solenoid, when the latter is energized, for actuating said second depresible member and having means for, when so moved, opening a break-type switch, identified as the third switch and which is initially closed; means for restoring said movable members to their original positions when said solenoids are de-energized; electric circuits for said solenoids and switches for de-energizing, via opening of the second and third switches, the first and second solenoids when and after said movable members have been initially actuated, and for energizing the first solenoid thereafter, via then so closed first switch, when electric energy is sent therethrough via one of said circuits.

4. In apparatus for automatically calling a telephone number on a push button type telephone secured therewith, a combination including a plurality of solenoids, a first solenoid thereof being stationary secured in a proximity of the telephone transmitter switch for actuating, when energized, a responsive thereto mechanical means adapted for closing said switch when so actuated; a second solenoid thereof being stationary secured in a proximity of a telephone push button for moving, when energized, thereagainst a responsive thereto button compressing means movably secured with said second solenoid; a delaying action relay mechanism adapted, fiirst, for channeling electric energy from available source and via provided electric circuits to the first solenoid for energizing the latter and thereby causing the closing of the telephone transmitter switch, and, thereafter, and after lapse of predetermined time based upon time required for occurrence of telephone dial tone, channeling said electric energy from said source to the second solenoid for energizing the latter and thereby causing the compression of said telephone push button by said button-compressing means.

5. In apparatus for use with a telephone on which a telephone number may be called by depressing one or more of push buttons after the telephone transmitter switch has been closed and time required for occurrence of telephone dial tone has elapsed, a combination including a plurality of solenoids, one thereof, identified as the first solenoid, adapted for actuating, when energized, a means responsive thereto for closing automatically the telephone transmitter switch; another thereof, identified as the second solenoid, adapted for actuating, when energizes, a telephone push-button depressing means responsive thereto; a delaying action relay mechanism adapted for channeling electric energy from available source and via provided electric circuits, first, to the first solenoid, then, after lapse of predetermined time based upon time required for occurrence of telephone dial tone, to the second solenoid.

6. Automatic telephone operating device for alarm transmitting systems using push button type telephone for dialing, a recorded message, an electrically operated means for conveying it into telephone receiver, and likewise operated actuating means responsive to provoking cause, and comprising plurality of solenoids, the first thereof for actuating means for closing telephone transmitter switch, the second thereof for actuating means for pushing telephone dial button; an electrically operated delaying action relay unit responsive to said provoking cause and adapted for channeling electric energy from available source and via provided electric circuits, first, to said first solenoid, then, after lapse of predetermined time based upon time required for occurrence of telephone dial tone, to said second solenoid and to said message conveying means.

References Cited in the file of this patent

UNITED STATES PATENTS

| | | |
|---|---|---|
| 2,371,051 | Kendig | Mar. 6, 1945 |
| 2,579,983 | Thornton | Dec. 25, 1951 |
| 2,717,927 | Hirschler | Sept. 13, 1955 |
| 2,768,239 | Foster et al. | Oct. 23, 1956 |
| 2,827,515 | Zuber | Mar. 18, 1958 |
| 2,878,315 | Agule | Mar. 17, 1959 |
| 2,883,460 | Andrews | Apr. 21, 1959 |
| 2,907,828 | Tegeler | Oct. 6, 1959 |